Figure 1:
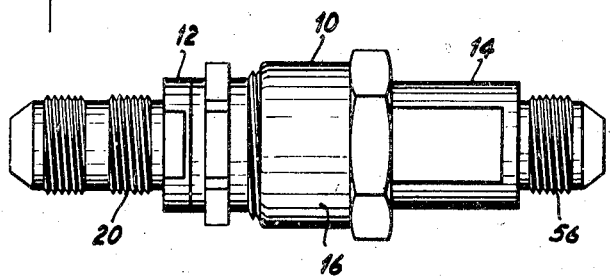

Oct. 12, 1948.　　　B. A. MAIN, JR　　　2,451,441
SELF-SEALING COUPLING
Filed March 28, 1945

Inventor
BENJAMIN A. MAIN, JR.
By Beaman & Langford
Attorney

UNITED STATES PATENT OFFICE 2,451,441

SELF-SEALING COUPLING

Benjamin A. Main, Jr., Jackson, Mich., assignor, by mesne assignments, to Aeroquip Corporation, Jackson, Mich., a corporation of Michigan Application March 28, 1945, Serial No. 585,308

1 Claim. (Cl. 284—18)

The present invention relates to improvements in self-sealing couplings of the type disclosed in United States Patent No. 2,208,286, granted to Julius Berger July 16, 1940.

The objects and advantages of the present invention reside in the specific details of construction, resulting in an improved design which will simplify the manufacture and reduce the cost by increasing permitted tolerances and reducing the percentages of rejections in assembly without sacrificing performance.

These objects and advantages are to be found in the combination, construction and arrangement of parts and will be more fully treated in the following specification and appended claim.

Figure 2:
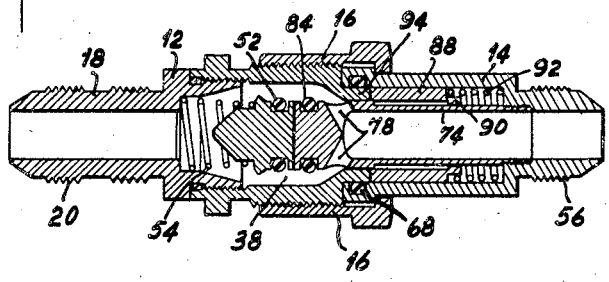
Figure 3:
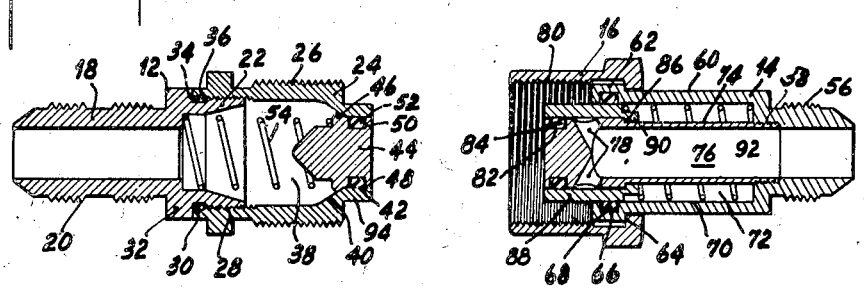

Referring to the drawings, in which one form of the invention is illustrated,

Fig. 1 is a side elevational view of the coupling parts in assembled or connected position, Fig. 2 is a vertical cross-sectional view of the coupling shown in Fig. 1, and Fig. 3 is a view similar to Fig. 2, showing the parts in their disconnected position.

The coupling shown in Fig. 1 is generally designated by reference character 10 and comprises two separable parts 12 and 14 which are held in assembled relationship by a nut 16, which when drawn up functions to manipulate the valve parts to open the coupling for the through passage of fluid.

As more clearly shown in Fig. 3, part 12 is made up of a nipple 18 externally threaded at 20 and 22 and a socket 24, externally threaded at 26 and internally threaded at 28. The threads 22 and 28 of the parts 18 and 24 are threaded together until the shoulder 30 engages with the shoulder 32. An annular recess is provided between the parts 18 and 24, as at 34, to receive the sealing rings 36. In this manner a leak-proof joint is provided which enables the parts 18 and 24 to be fabricated separately to provide for convenient assembly of the interior parts into the enlarged chamber indicated at 38.

Partially defining the chamber 38 is a conical valve seat portion 40 and a cylindrical portion 42. A valve 44, conical portion 46 and a cylindrical portion 48 are provided with an annular groove 50 to receive the sealing ring 52. The spring 54 continuously urges the valve 44 in the position shown in Fig. 3.

As is more clearly shown in the right-hand portion of Fig. 3, the part 14 is externally threaded at 56 and internally threaded at 58. At one end of the outer body portion 60 is an enlargement 62 providing a shoulder 64 and an annular recess 66 in which is located the sealing ring 68. The inner cylindrical wall 70 defines a chamber 72.

A tubular valve part 74 has a cylindrical body portion 76 threaded at one end to threadingly engage with the internal threaded portion 58 of the part 14. The opposite end of the valve part 74 is closed except for transverse ports 78, which are slightly enlarged to provide a cylindrical end portion 80 having defined therein an annular recess 82 to receive the sealing ring 84. A shoulder 86 is defined between the cylindrical portions of different diameters.

The sleeve valve part 88 is in sliding fit with the valve part 74 as well as with the cylindrical inner wall 70 of the part 14. At one end the internal diameter is reduced to provide a shoulder 90 for engaging with the shoulder 86 at the outward position of the sleeve 88 under the stress of the spring 92. The sealing rings 68 and 84 internally and externally seal with the sleeve 88.

The part 12 is provided with a cylindrical nose portion 94 having an external diameter corresponding to the diameter of the sleeve 88. When the parts 12 and 14 are brought into the connected position, shown in Fig. 2, through manipulation of the nut 16, the cylindrical nose portion 94 abuts against the outer end of the sleeve 88 to displace the same in the manner shown in Fig. 2, bringing the ports 78 into communication with the chamber 38. With the parts in this position the sealing ring 68 is now sealing upon the cylindrical nose portion 34 in lieu of the outer surface of the sleeve 88. Upon backing off the nut 16 in the position shown in Fig. 2, the parts assume their disconnected position shown in Fig. 3.

Having described the details of construction of my improved self-sealing coupling, what I claim as new and desire to be protected by Letters Patent is:

In a self-sealing coupling of the class described, a pair of separable tubular body parts, a fixed valve part in one of said body parts, a movable valve part in the other of said body parts, the latter having a cylindrical nose portion telescoping into the other body part when the two parts are connected, said valve parts having abutting complementary faces, said fixed valve part having a cylindrical outer head portion having radial ports defined therein, a cylindrical sleeve slidable over said cylindrical outer portion to close said ports and having a plain cylindrical outer surface, the latter being co-extensive with said cylindrical nose portion of the other body part when the two parts are connected and the abutment of said nose portion with said sleeve serving to force the sleeve rearwardly to uncover said radial ports upon such connection, the sleeve having a piston fit within its body part, a spring for restoring the sleeve to its port closing position when the body parts are disconnected, a peripheral groove located in said cylindrical head, a sealing ring in said groove to provide a seal between said sleeve and head portion, a shoulder back of said head portion, an inwardly directed shoulder on said sleeve engaging with said first shoulder to limit outward movement of said sleeve, a peripheral groove on the interior surface of the body part carrying said sleeve and adjacent the end of this body part containing its fixed valve part, and a sealing ring in said groove adapted to seal about said sleeve, when the parts are disconnected, or to seal about said nose portion when the two body parts are connected.

BENJAMIN A. MAIN, Jr.

REFERENCES CITED

The following references are of record in the file of this patent:

UNITED STATES PATENTS

| Number | Name | Date |
|---|---|---|
| 1,335,521 | Murphy | Mar. 30, 1920 |
| 1,679,257 | Neebe | July 31, 1928 |
| 1,710,635 | Wertz | Apr. 23, 1921 |
| 2,185,173 | Fortune | Jan. 2, 1940 |
| 2,208,620 | Baisch | July 23, 1940 |
| 2,210,282 | Corbin | Aug. 6, 1940 |
| 2,254,997 | Fisher | Sept. 2, 1941 |
| 2,304,390 | Wolfram | Dec. 8, 1942 |
| 2,319,015 | Speth | May 11, 1943 |
| 2,383,249 | Hardwick | Aug. 21, 1945 |
| 2,391,022 | Main | Dec. 18, 1945 |